United States Patent [19]

Takamatsu et al.

[11] 4,430,225

[45] Feb. 7, 1984

[54] AERATION TANK FOR ACTIVATED-SLUDGE PROCESS SEWAGE TREATMENT

[75] Inventors: Akira Takamatsu; Hiroshi Higuchi, both of Tochigishi, Japan

[73] Assignee: Kabushiki Kaisha Mitsui Miike Seisakusho, Nihonbashi-Muromachi, Japan

[21] Appl. No.: 337,572

[22] Filed: Jan. 7, 1982

[30] Foreign Application Priority Data

Feb. 17, 1981 [JP] Japan .................................. 56-21943

[51] Int. Cl.$^3$ .............................................. C02F 3/16
[52] U.S. Cl. .................................. 210/608; 210/626; 210/629; 210/219; 210/220
[58] Field of Search ................... 210/608, 620–629, 210/219–221.2, 220

[56] References Cited

U.S. PATENT DOCUMENTS

| 3,444,076 | 5/1969 | Sekikawa et al. | 210/625 |
| 3,772,187 | 11/1973 | Othmer | 210/219 |
| 4,085,041 | 4/1978 | Fullerton et al. | 210/608 |
| 4,267,050 | 5/1981 | Conway et al. | 210/625 |
| 4,290,885 | 9/1981 | Kwak | 210/219 |
| 4,374,027 | 2/1983 | Severeid et al. | 210/629 |

FOREIGN PATENT DOCUMENTS

| 1038509 | 9/1978 | Canada | 210/219 |
| 35233 | 8/1965 | Finland | 210/219 |

Primary Examiner—Benoît Castel
Attorney, Agent, or Firm—Oldham, Oldham, Hudak, Weber & Sand Co.

[57] ABSTRACT

A pressurized aeration tank is provided which comprises an inner barrel arranged on the tank axis and an axial-flow impeller of optimum characteristics mounted therein, the inner barrel and the outer barrel or body portion of the tank being particularly proportioned and arranged relative to each other to define in the tank a circuitous flow passage of minimal total resistance loss. With this tank structure, a highly improved plant efficiency of BOD removal is readily obtainable with the use of concentrated activated sludge and aerobic microorganisms, mainly of the Opercularia group, in a specified range of tank pressure.

4 Claims, 7 Drawing Figures

AERATION TANK FOR ACTIVATED-SLUDGE PROCESS SEWAGE TREATMENT

BACKGROUND AND SUMMARY OF THE INVENTION

This invention relates generally to aeration tanks for activated-sludge process sewage treatment and is intended to provide a new and improved aeration tank of the type described which is particularly suitable for treating high-BOD (biochemical oxygen demand) domestic sewage or industrial waste to reduce the BOD of such liquid waste to a large extent.

The present invention proceeds from the realization that, with an eye to the advantageous features of the activated-sludge process, best economy and performance are to be obtained with a pressurized aeration tank having an axial-flow pump incorporated therein provided that such tank is operated under specified conditions. As is well known for removal of high BOD levels, a pressurized aeration tank can conveniently be resorted to, which basically utilizes the fact that the amount of air dissolvable increases with rise of the pressure applied, as Henry's law states. With mere use of a pressurized aeration tank, however, any highly efficient BOD removal cannot be realized and it is prerequisite for high-efficiency sewage treatment that the three elements, including BOD, oxygen and aerobic microorganisms, are all brought into contact and mixed with each other rapidly in a uniform fashion. To meet this requirement, the tank should be operated basically upon the principle of vigorous mechanical agitation. However, mere introduction of any vigorous mechanical agitation, which necessitates a large power supply, does not contribute to the BOD removal so much as expected, nor enables any substantial reduction in floor space required for tank installation. Under these circumstances, it is to be noted that the vigorous mechanical agitation can be made the best of only with use of an axial-flow impeller pump.

Description will next be made of the construction and operation of the present invention with reference to the accompanying drawings, which illustrate a preferred embodiment of the invention.

DESCRIPTION OF THE PREFERRED EMBODIMENT

Figure 1:
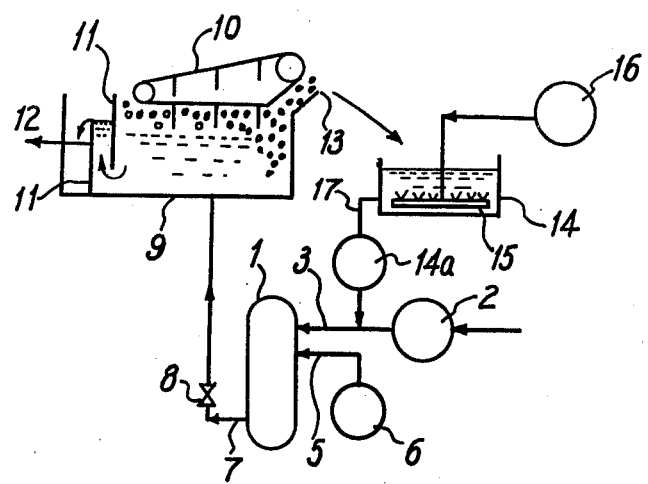
FIG. 1 is an activated-sludge process flow chart of the system including an aeration tank embodying the principles of the present invention, illustrating the system arrangement that enables the aeration tank to work at its highest efficiency.

Referring to FIG. 1, reference numeral 1 indicates an aeration tank of the present invention, which is in fluid communication with a liquid-waste supply pump 2 by way of an influent pipe 3, which is also in fluid communication with an activated-sludge supply pump 14a. The aeration tank 1 is connected with a compressor 6 by way of a compressed-air pipe 5 and also with a flotation separator tank 9 by way of an effluent pipe 7 with a throttle valve 8 inserted therein. The separator tank 9 is provided with a scraper 10 and partition plates 11, as shown. Reference numerals 12 and 13 respectively indicate a clarified-liquor outlet and an activated-sludge discharge opening of the separator tank 9. Reference numeral 14 indicates an activated-sludge tank provided at its bottom with an air diffuser pipe 15, which is connected with a blower 16. Reference numeral 17 indicates a pipe interconnecting the sludge tank 14 and activated-sludge supply pump 14a.

In operation, the aeration tank 1 is fed with liquid waste, activated sludge and compressed air in a continuous fashion by pump 2, pump 14a and compressor 6, respectively. The mixed liquor aerated under pressure in the tank 1 is directed therefrom to the separator tank 9 in a continuous fashion. On its way to separator tank 9, the mixed liquor is substantially reduced in pressure the moment it passes through the throttle valve 8 so that air bubbles are formed in large quantities in the flow of mixed liquor. Such air bubbles serve to promote flotation of activated sludge in the separator tank 9. The activated sludge floated to the surface is discharged through the discharge opening 13 and recirculated to the activated-sludge tank 14 while the clarified liquor leaves the separator tank 9 at outlet 12, overflowing the weir plate 11. The activated sludge in the tank 14 is exposed to air blown therein by blower 16 to restore its normal activated state and then returned to the aeration tank 1 by pump 14a.

Description will next be made with reference to FIG. 2, which shows the aeration tank 1 in vertical cross section, and FIG. 3 which shows, on an enlarged scale, a tank bottom portion including an impeller unit mounted therein.

Figure 2:
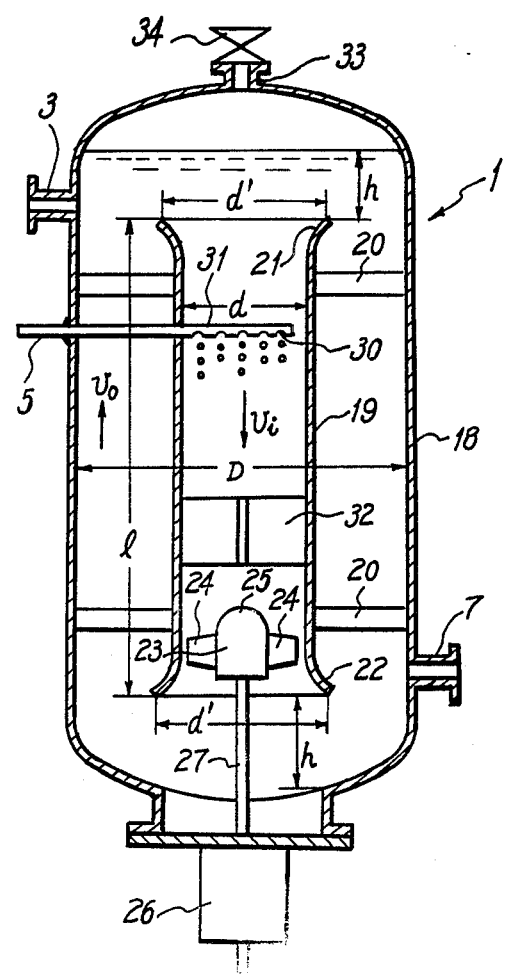
FIG. 2 is a cross-sectional elevation of a preferred form of aeration tank of the present invention.
Figure 3:
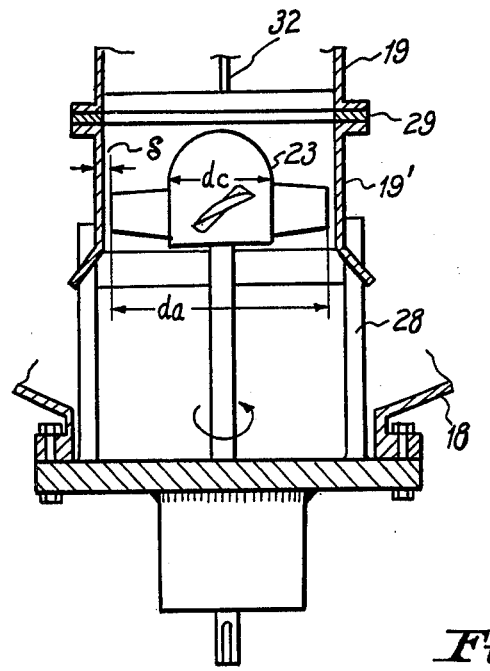
FIG. 3 is a fragmentary cross section showing, on an enlarged scale, a bottom portion of the aeration tank of FIG. 2.

As shown in FIG. 2, the aeration tank 1 comprises a cylindrical-shaped vertical-type body portion or outer barrel 18 and a cylindrical-shaped inner barrel 19 arranged vertically in the outer barrel 18 in concentric relation thereto and fixedly supported therein by support members 20, which also serve as baffle plates. The inner barrel 19 is formed at its top and bottom ends with bellmouthed or conically shaped flanges 21 and 22, respectively. Reference numeral 23 indicates an axial-flow impeller having blades 24 of aerofoil profile and formed on the inlet side of its boss with a semispherical cap 25, which serves to make smooth the flow to the impeller blades. The clearance $\delta$ (FIG. 3) between the inner peripheral surface of inner barrel 19 and the impeller blades 24 should be limited as much as possible in order to prevent counterflow. The ratio of the inside diameter d of inner barrel 19 to the outside diameter $d_a$ of impeller 23 should be selected in the range of $d/d_a \leq 1.01$. Reference numeral 26 indicates a drive source mounted on the bottom outside of aeration tank 1 in driving connection with the shaft 27 of impeller 23. Referring to FIG. 3, the inner barrel 19 is divided into an upper, major section and a lower section 19' in which the impeller 23 is axially mounted. The divided structure of inner barrel 19 is particularly desirable from the viewpoint of machining cost since it necessitates precision machining only on the inner peripheral surface of the lower section 19'. Reference numeral 28 indicates support members arranged to support the lower section 19' on the tank bottom; and 29 indicates packing means interposed between the bottom section 19' and the major section of inner barrel 19.

Referring again to FIG. 2, the compressed-air pipe 5 is extended into the inner barrel 19 at an appropriate level, and its terminal portion 31, lying within the inner barrel 19, is formed in the bottom wall thereof with a large number of spaced jet orifices 30 to serve as an air diffuser pipe. Reference numeral 32 indicates straightening plates radially arranged in the inner barrel 19 at an appropriate level on the upstream side of the axial-flow impeller 23; 33 indicates an air vent provided at the top of outer barrel 18; and 34, a throttle valve connected to the air vent 33. In operation, the aeration tank 1 is pressurized under the combined effects of the liquid-waste supply pump 2 (FIG. 1) connected to the upstream end of influent pipe 3 and the throttle valve 8 arranged in the effluent pipe 7 and the rate of flow through the influent pipe 3 and that through the effluent pipe 7 are normally held balanced to each other.

Figure 4:
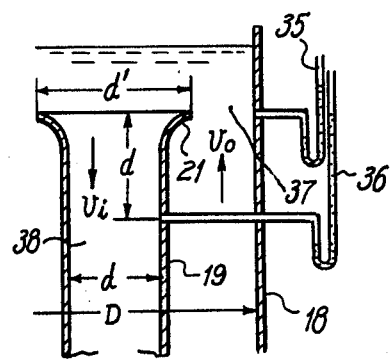
FIG. 4 is a fragmentary cross section illustrating a flow-measuring device arranged on one side of the aeration tank.

FIG. 4 illustrates the arrangement of a flow-measuring device which comprises manometers 35 and 36 fitted to the outer and inner barrels 18 and 19, respectively, and opening at the inner, high-pressure end into the annular flow passage 37 defined between the outer and inner barrels and the flow passage 38 defined by the inner barrel 19 inside thereof, respectively. As shown, the high-pressure end opening, i.e., static-pressure receiving aperture, of the manometer 35 is located in the outer flow passage 37 at substantially the same level as that of the top bellmouth flange 21 of the inner barrel 19 whereas the high-pressure end opening of the other manometer 36 is located in the inner flow passage 38 at a level spaced downwardly from the bellmouth flange 21 by a distance equal to the inside diameter d of the inner barrel 19.

In sewage treatment with activated sludge, dominant factors include: first, the pump characteristics of the axial-flow pump used; secondly, the solubility of oxygen; and, thirdly, the reactivity of activated sludge. The characteristic features of the present invention will now be described in connection with each of these three factors.

(1) Axial-flow pump characteristics

Figure 5:
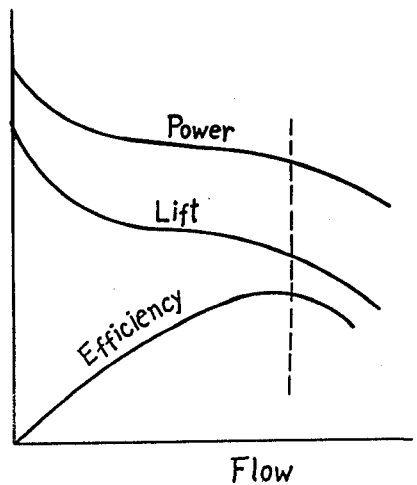
FIG. 5 is a graph showing the performance characteristics of the axial-flow impeller shown in FIG. 2.

Being a turbo machine of high specific speed, an axial-flow pump exhibits pump characteristics of high flow rate and limited lift and is most suited for the purpose of the present invention of establishing a large circulating flow of fluid along a circuitous path of limited length. The performance of an axial-flow impeller pump can be expressed by the relationships between flow and lift, between flow and power, and between flow and efficiency. As illustrated in the diagram of FIG. 5, the pump efficiency has a maximum value in a relatively high flow region wherein the pump lift and power required are both comparatively limited. Because of this, it is a first requisite for improvement of the pump efficiency to reduce the flow resistance of the fluid circuit to a minimum thereby to decrease the lift required.

In this connection, there is a general tendency to suppose that, the larger the number of baffle plates provided in the fluid circuit and hence of vortices formed therein, the larger the mixing effect obtainable in the fluid circuit is. Baffle plates, however, constitute a primary factor of increase in resistance loss and, causing reduction in flow rate and efficiency as well as increase in power required, render the operation of the system as a whole inefficient. Formation of vortices in any excess only means a substantial increase in volume of the dead space in the aeration tank, which has nothing to do with the fluid circulation in the tank, and is practically disadvantageous, resulting in increased mixing irregularities. In practice, therefore, it is desirable to minimize the number of baffle plates or the like flow-resisting members employed thereby to maintain a high flow rate in the fluid circuit.

In the aeration tank of the present invention, the support members 20, which interconnect the outer and inner barrels 18 and 19 in a manner to support the latter in the former, serve also as baffle plates, as previously described, and impart a certain degree of impact to the rotational flow of fluid leaving the impeller 23. Use of such support members, however, involves only a limited amount of resistance loss that forms only a small portion of the total resistance loss of the fluid circuit as compared with that portion of the total resistance loss which is attributable to the flow contractions and bends arising from sharp changes in flow passage area at and about the flow inlet and outlet of the inner barrel 19. Accordingly, it is an important objective of the present invention to reduce the resistance loss of the circuitous path of fluid in the aeration tank particularly in connection with the structure and arrangement of the inner barrel 19.

A desirable form of fluid circuit to attain this objective is given in the embodiment of FIG. 2, in which the inner tube or barrel 19 is formed at its top and bottom ends with bell-mouthed or conically-shaped flanges 21 and 22, respectively, as described hereinbefore, and is vertically arranged in the outer barrel 18 in a position such that the top and bottom edges of the inner barrel 19 are vertically spaced from the top surface of fluid in the tank 1 and from the tank bottom both by a sufficient distance h of at least 0.37d with this arrangement, a circuitous path of fluid is obtained in the tank which converges and spreads out in a gradual fashion around the inlet and outlet ends of the inner barrel 19, as will be readily observed in FIG. 2.

According to the present invention, it is to be noted that, with the inside diameter D of outer barrel 18 selected at a fully large value compared with that d of the inner barrel 19, the flow of liquor in the vicinity of the top of inner barrel 19 is substantially linear with the rotational flow component materially reduced. Accordingly, the downward flow formed within the inner barrel 19, of the liquor running into the barrel 19 at its top, is again substantially linear. The inner barrel 19, having an axial length l selected at a value of not less than six times the inside diameter d, practically serves as a straight tube section effective to feed the impeller 23 with the liquor in the form of a straightened, substantially laminar flow. Any rotational flow component present must result in reduction in flow rate and the provision of a straight tube section of such substantial length is very desirable for securing a high rate of flow. In this instance, since the liquor is under pressure, there is no need of taking cavitation into consideration nor of providing any guide vanes as conventionally employed to convert the rotational flow component of the liquor leaving the impeller to a completely axial flow form in order to change any surplus dynamic pressure into static pressure. The rotational flow component arising under the drive of the impeller is rather useful in increasing the mixing effect and can be fully retarded simply by increasing the cross-sectional area of the flow passage from the bottom outlet of the inner barrel back to the top inlet thereof. In this manner, the rotational flow component of the liquor on the downstream side of the impeller can be fully utilized for substantial increase of the mixing effect together with the pressure conversion, from dynamic to static.

In this connection, it has been found that the purpose of increasing the pump efficiency as much as possible while minimizing the power requirement under the condition that the volume of flow of the liquor is held at its maximum can be attained by employing an impeller designed as a high-efficiency axial-flow pump having blades of Götingen, NACA, or the like type aerofoil form designed with a well-selected specific speed. Specifically, in the present invention, an axial-flow impeller is employed which has blades of an aerofoil section of a specific speed selected in the range of from 900 to 3000 (rpm·$\sqrt{m^3/min}/m^{\frac{3}{4}}$) and is fully capable of delivering a large flow of liquor desired. Further, in the present invention, the ratio of the inside diameter d of inner barrel 19 to the outside diameter $d_a$ of the impeller is selected in the range of $d/d_a \leq 1.01$ so that the volume of liquor flowing back through the clearance between the inner barrel 19 and the impeller blades 24 to the upstream side of the impeller 23 is very limited.

Figure 6:
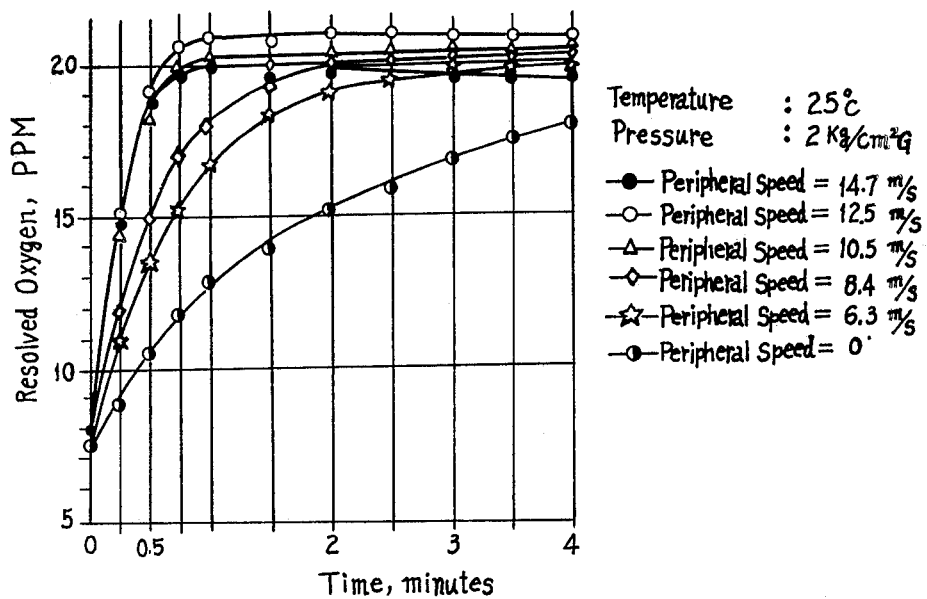
FIG. 6 is a graph illustrating a number of solubility curves of oxygen gas.

In order to make uniform the flow pattern in the aeration tank, it is desirable to keep the peripheral speed u of the axial-flow impeller 23 at a definite level. Use of an axial-flow impeller is highly convenient for scaling up the system as it enables formation of the same flow pattern in the aeration tank irrespective of the tank size as long as the u and the relative and absolute velocities in combination form the same velocity triangle. Under this condition, the number of revolutions per minute, n, of the impeller is in inverse proportion to its outside diameter $d_a$, decreasing with increase in size of the impeller. The congruent triangle of velocities can conveniently be represented by any one of its sides, for example, u, which plays the role of motive power for mechanical mixing, and, with rise of u, its contribution to agitational mixing of the liquor increases. At the same time, however, the power required for agitation is undesirably increased and, owing to increasing pulverization of the activated sludge, the BOD removal capabilities of the system deteriorate. Therefore, u should be determined at an optimal value. FIG. 6 graphically represents the results of air solubility tests conducted with different peripheral speeds u of the impeller unit at water temperature of 25° C., and pressure of 2 kg/cm²G. In FIG. 6, the abscissa represents time in minutes and the ordinate represents amount of dissolved oxygen in ppm. As observed in the chart, the optimum range of u based on air solubility considerations is from 8 to 15 m/s and it has been found that such u range is most favorable for biological oxidation as well.

(2) Solubility characteristics of oxygen

In order to dissolve large volumes of oxygen in the liquor, it is indispensable to supply thereto air under pressure. Further important considerations are to arrange so that the air as introduced into the liquor is held against rapidly rising to its top surface and escaping therefrom before it dissolves in the liquor and also to agitate the liquor in order that the air may dissolve in the liquor as quickly as possible. To meet these requirements, in the aeration tank of the present invention, the air diffuser pipe 31 is arranged, as described hereinbefore, in the inner barrel 19, through which the liquor flows downwardly at high velocity, and the air orifices 30 formed in the wall of diffuser pipe 31 are directed downwardly toward the impeller 23. With this arrangement, it is to be noted that there is no rise of air bubbles formed in the flow of liquor in the inner barrel 19 and dissolution of oxygen in the liquor is effectively promoted. The optimum value of axial flow velocity Vi in the inner barrel 19 is in the range of from 2 to 4 m/s.

The pressure of supply air is selected in the range of from 2 to 5 kg/cm²G. Air bubbles formed in the inner barrel 19 of aeration tank 1 are finely divided under the shear action of the impeller rotating at high speed so that the three elements, including oxygen, BOD and aerobic microorganisms, are all mixed together rapidly in a uniform fashion.

(3) Reaction characteristic of the activated sludge

Figure 7:
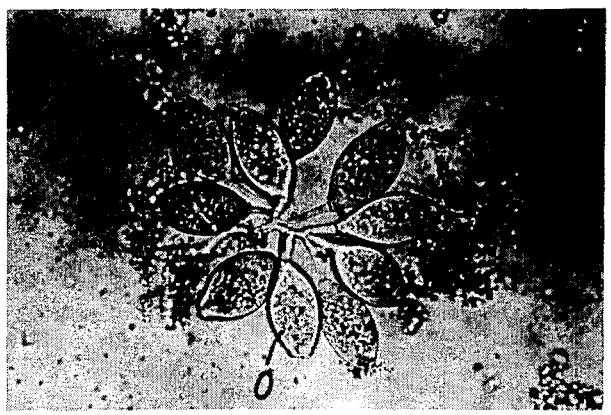
FIG. 7 is a photomicrograph of *Opercularia*.

The activated-sludge process of liquid waste treatment is principally based on its functioning to decompose the organic material in the liquid waste into harmless substances such as $CO_2$ and $H_2O$ under the biochemical oxidizing action of aerobic microorganisms and use of concentrated activated sludge is indispensable for efficient removal of any high BOD. Further, in the present invention, the aerobic microorganisms employed are mostly of the *Opercularia* group. In FIG. 7, which represents a photomicrograph ×400 of *Opercularia*, reference character O indicates *Opercularia* individuals. *Opercularia* are of tough constitution, reproducing themselves with their vitality sustained in a high-pressure atmosphere containing oxygen in high concentration. In the present invention, not only large volumes of oxygen are dissolvable in the liquor under applied pressure but an appropriate agitational force is employed which enables the aerobic microorganisms to remain fully activated without the danger of being divided to any excessive extent.

The ratio of the inside diameter d of the inner barrel 19 of aeration tank 1 to that D of the outer barrel 18 thereof is preferably selected in the range of from 0.2 to 0.4 so that the flow velocity Vo of the liquor rising through the annular passage defined between the outer and inner barrels 18 and 19 may be fully reduced. Activated sludge, coagulative in nature, is first disintegrated and increased in surface area under the action of impeller 23 so that the chances of the BOD coming into contact with the dissolved oxygen are made even and uniform and, hereupon, the shear effect of the impeller is moderated to allow time for the sludge to re-coagulate with sufficient amounts of BOD and dissolved oxygen held therein in order that the biological oxidation may effectively be promoted. It has been found experimentally that Vo should be selected at a value in the range of from 0.2 to 0.4 m/s for best results.

In order that the treating capabilities of the system may be maintained, the average number (Nc) of times the liquor in the aeration tank is circulated therein should be at least 70.

As apparent from the foregoing descriptions (1), (2) and (3), the pressurized aeration tank of the present invention is of the construction and arrangement designed to minimize the total resistance loss of the circuitous path of flow formed therein by employing an axial-flow impeller pump having optimum characteristics and, with the use of concentrated activated sludge and of aerobic microorganisms, mostly of the *Opercularia* group, exhibits an extraordinarily high efficiency of BOD removal. For example, the BOD volume load, B, is expressed by $$B = 1440\, qC/V,\ kg\text{-}BOD/m^3 day$$

where q is the rate of flow into (or out of) the aeration tank in m³/min; C is the BOD concentration in kg/m³; and V is the effective capacity of the aeration tank in m³. While in the conventional activated-sludge process the value of B is 0.5 or under, it has been ascertained that with use of a pressurized aeration tank of the present invention the value of B can be selected in a much higher range of from 10 to 30. In other words, according to the present invention, the capacity of the aeration tank can safely be determined in a range of from one-twentieth to under one-sixtieth the tank capacity normally required in the conventional activated-sludge process for removal of the same amount of BOD.

The means number of recirculations $N_m$ is represented by the following equation:

$$N_m = Q/q$$

where q designates a rate of flow from the centrifugal pump 2 to the aeration tank 1 (see FIG. 1), wherein q is substantially smaller than Q.

The term "mean number of recirculations" means that some liquid particles contained in a flow into the aeration tank leave there merely after a single circulation therethrough and some other liquid particles fail to leave there even after a number of recirculations therethrough, both of which are a very rare case, whereas most of the liquid particles leave there after completion of the above number of recirculations.

Correct control of $N_m$, that is, correct control of Q as well as q is ensured by the optimum selection of the axial flow pump 23 in FIG. 2 and the centrifugal pump 2 in FIG. 1.

While only one preferred embodiment of the present invention has been shown and described herein, it will be apparent to those skilled in the art that various changes and modifications may be made therein without departing from the spirit or the scope of the invention as set forth in the appended claims. For example, the same sewage-treating capabilities are obtainable even with a modified form of tank structure which includes an impeller pump mounted in the aeration tank close to the top thereof so as to be driven by motor means arranged on the tank top.

What is claimed is:

1. An activated sludge process sewage treatment method for fluid received in a pressurized aeration tank (1) with an inner barrel (19) and an axial flow impeller (23) mounted therein at a lower end thereof, said aeration tank forming an outer barrel (18), said inner barrel (19) having a cylindrical configuration and being arranged so that the ratio of the inside diameter d of the inner barrel (19) to the outside diameter $d_a$ of the axial flow impeller (23) is selected within the range of $d/d_a \leq 1.01$, and said inner barrel is formed of such dimensions that the ratio d/D of the inside diameter d of the inner barrel (19) to the inside diameter D of the outer barrel (18) of the aeration tank (1) is selected in the range of 0.2 to 0.4, comprising:

keeping pressure in the pressurized aeration tank (1) in the range of 2 to 5 Kg/cm²G;

driving an axial flow impeller in the tank at a peripheral speed selected in the range of 8 to 15 m/s, said axial flow impeller (23) including a plurality of blades (24) having an aerofoil sectional configuration with a $\overline{\text{specific speed}}$ in the range of 900 to 3000 rpm $\sqrt{m^3/min/m^{\frac{3}{4}}}$;

including aerobic microorganisms of *Opercularia* group in the fluid;

flowing the fluid upwardly through an annular passage defined between outer and inner barrels (18) and (19) with a flow velocity $V_o$ in the range of 0.2 to 0.4 m/s the tank and flowing fluid downwardly through the inner barrel, and circulating fluid in the aeration tank (1) with the mean number of recirculation cycle being at least 70.

2. In a pressurized aeration tank for an activated sludge process sewage treatment system in which a pressurized aeration tank (1) with an inner barrel (19) and an axial flow impeller (23) mounted therein, a flotational separator tank (9) for separating activated sludge and clarified liquor and an activated sludge tank (14) are operatively arranged and fluidly connected for recirculation of the activated sludge, the improvement consisting in that, said axial flow impeller (23) includes a plurality of blades (24) having an aerofoil sectional configuration with a $\underline{\text{specific}}$ speed in the range of 900 to 3000 rpm $\sqrt{m^3/min/m^{\frac{3}{4}}}$; and said inner barrel (19) having a cylindrical configuration and being arranged in such a relationship that a ratio of the inside diameter d of the inner barrel (19) to the outside diameter $d_a$ of the axial flow impeller (23) is selected within the range of $d/d_a \leq 1.01$, further being formed in such dimensions that a ratio of the axial length l of the inner barrel (19) to the inside diameter d of the same is selected within the range of $l/d \geq 6$ while being formed at its bottom end with a bell-mouthed or conically shaped flange (22) in such a position that a ratio h/d of the distance h of the edge of the bottom flange (22) from the tank bottom to the inside diameter d of the inner barrel (19) is no less than 0.37, further being formed in such dimensions that a ratio d/D of the inside diameter d of the inner barrel (19) to the inside diameter D of the outer barrel or body portion (18) of the aeration tank (1) is selected in the range of 0.2 to 0.4 and further being provided with an air diffuser pipe (31) connected to a compressor (6) by way of a compressed air pipe (5).

3. A pressurized aeration tank as claimed in claim 2, wherein the inner barrel (19) is constructed in the form of a divided structure including an upper major section and a lower section (19') and the axial flow impeller (23) is mounted in said lower section (19').

4. A pressurized aeration tank as claimed in claim 2, wherein the pressurized aeration tank (1) is provided with static pressure measuring devices (35,36), one (35) of said static pressure measuring devices (35,36) including a pressure receiving aperture opened to the outer annular flow passage (37) which is defined around the inner barrel (19) at the substantially same level as the top bellmouthed edge (21) of the inner barrel (19) and the other one (36) including a static pressure receiving aperture opened in the flow passage (38) which is defined by the inner barrel (19) inside the latter at a level spaced downwardly from the top edge of the upper bellmouthed flange (21) on the inner barrel (19) by a distance equal to the inside diameter d of the inner barrel.

* * * * *